2,697,120

PREPARATION OF DICHLORACETALDEHYDE AND CHLORAL

Everett E. Gilbert, Flushing, N. Y., assignor to Allied Chemical & Dye Corporation, New York, N. Y., a corporation of New York No Drawing. Application May 2, 1949,
Serial No. 91,003

6 Claims. (Cl. 260—601)

This invention relates to the manufacture of chlorinated aldehydes and is particularly concerned with the conversion of acetaldehyde or its reversible polymers, e. g. paraldehyde, to polychlorinated acetaldehydes, i. e. dichloracetaldehyde and chloral.

In the past chloral has been manufactured commercially by chlorination of alcohol. This reaction, however, is slow, hazardous and of a highly complex nature requiring careful control and handling to obtain satisfactory yields of chloral. While it has been proposed to prepare chloral as well as dichloracetaldehyde from acetaldehyde by chlorination, yields of the desired products have been so small that the process has never been commercialized. One of the chief difficulties involved in such chlorination is the tendency of acetaldehyde to undergo side reactions of the condensation type as soon as a trace of HCl produced by the reaction is formed, thereby lowering the yield of polychlorinated acetaldehyde product. As is well known, chloral is the organic raw material employed in preparing the important insecticide DDT (p,p' dichlorodiphenyl-1,1,1-trichloroethane). DDT is produced by reacting chloral with chlorobenzene in the presence of sulfuric acid. Dichloracetaldehyde is of use as an intermediate in the production of chloral, and is also employed to prepare the insecticide di(p-chlorophenyl) dichloroethane.

It is an object of the present invention to produce chlorinated acetaldehydes. Another object is the preparation of polychlorinated acetaldehydes, e. g. dichloracetaldehyde and chloral or either of them, in good yields by the chlorination of acetaldehyde or its reversible polymers such as paraldehyde while substantially preventing deleterious side reactions from taking place. A further object of the invention is to provide simple liquid phase processes minimizing explosion hazards and adapted for either batch or continuous operation.

Further objects and advantages of the invention will be apparent from the following detailed description thereof.

In accordance with the invention, I have found that a chlorinated acetaldehyde, particularly a polychlorinated acetaldehyde, may be produced in comparatively good yields by chlorinating an acetaldehyde in a liquid hydrophilic organic diluent substantially inert to the acetaldehyde starting material and the chlorination products thereof, the amount of diluent employed being sufficient to substantially prevent deleterious side reactions at the temperature of chlorination. The diluent is a solvent comprising one or more chlorinated compounds containing a total of two carbon atoms, one of which constitutes the carbon atom of a carbonyl group. The diluent functions as a reaction medium inhibiting self-condensation and other side reactions of acetaldehyde in the presence of HCl which lower the yield of chlorinated aldehyde, and also serves to dissipate the heat from the strongly exothermic reaction between chlorine and acetaldehyde. Since the reacting aldehyde as well as the heat of reaction is effectively dispersed throughout a relatively large volume of diluent reaction medium, there is no necessity of maintaining low temperatures of reaction, and yields of polychlorinated acetaldehyde product are materially enhanced as a result of rapid chlorination of the acetaldehyde at elevated temperatures before deleterious side reactions get under way.

Acetaldehyde, $CH_3CHO$, or any of its reversible polymers, e. g. paraldehyde, having the formula $(CH_3CHO)_3$, may be employed separately or in admixture as the organic starting material in my process. Paraldehyde (B. P. 124° C.) is preferred over acetaldehyde (B. P. 20° C.) in commercial operation since the lower volatility of paraldehyde renders it much less of a fire hazard than acetaldehyde and at the same time occasions less loss of the starting material in handling. It is believed the reversible polymers of acetaldehyde such as paraldehyde depolymerize during chlorination. In any event, it is my experience that paraldehyde and acetaldehyde react substantially in the same manner with chlorine under the herein described conditions to produce the desired polychlorinated acetaldehydes. The term "an acetaldehyde" in the claims is intended to denote either free acetaldehyde or acetaldehyde in the form of its reversible polymers, e. g. paraldehyde. The aldehyde starting material may be added in liquid form all at once or gradually to the reaction mixture. Alternatively, and particularly when acetaldehyde itself is utilized as starting material, the aldehyde may be introduced in vapor phase into the reaction mixture either alone or mixed with an inert gas such as nitrogen or carbon dioxide.

The preferred diluents employed in my process include chlorination products of the aldehyde starting material, e. g. dichloracetaldehyde or chloral or mixtures thereof; mono-, di-, or trichloracetic acid or mixtures thereof; or mixtures of the chlorinated acetic acids with the chlorinated aldehydes. Acetic acid may be used as diluent for the process, but when used, it becomes chlorinated, so that the actual diluent present during the reaction is a mixture of chlorinated acetic acids. The diluent may be recovered from the reaction mixture and used for succeeding charges of reactants. Thus, when acetic acid is used initially, the final diluent may be essentially chlorinated acetic acids, and when mono- or dichloracetic acid is employed initially, the final diluent may be trichloracetic acid, such final diluents being present together with the chlorinated acetaldehydes resulting from the reaction taking place in the reaction mass.

Throughout the reaction period the chlorine available for reaction is generally maintained in excess of the theoretical amount required to react with the aldehyde starting material present for obtaining the desired product. For production of dichloracetaldehyde, at least 2 mols of chlorine per mol of acetaldehyde are theoretically required for reaction, while for preparation of chloral at least 3 mols of chlorine per mol of acetaldehyde are theoretically required. However, for production of polychlorinated acetaldehydes in accordance with the invention, more than 2 mols of chlorine per mol of aldehyde are ordinarily employed, the amount depending on the degree of chlorination desired. The chlorine gas is usually added gradually to the reaction mixture.

The term "gradual" or "gradually," as applied to addition or introduction of acetaldehyde starting material and chlorine into the reaction mixture during the reaction period, is intended herein to denote either intermittent or continuous addition of these reactants.

One simple mode of carrying out the process involves mixing all the acetaldehyde or paraldehyde with a relatively large volume of diluent such as chlorinated acetic acid or chlorinated acetaldehyde, followed by gradual addition of chlorine to the reaction mixture until the desired chlorinated product is formed. The molar ratio of diluent to aldehyde starting material introduced may vary widely, at least about ¾ mol and usually in the neighborhood of one mol or more of diluent being utilized per mol equivalent of acetaldehyde. On completion of chlorination the reaction mixture may then be subjected to fractional distillation to isolate the chlorinated aldehyde product from the diluent, e. g. chlorinated acetic acid. If the original diluent is chlorinated acetaldehyde, a portion of the chlorinated material may be withdrawn and the remaining portion used as diluent for a succeeding cycle without resorting to the aforementioned distillation procedure. The above chlorination procedure, however, must be carefully controlled, particularly as regards rate of chlorine feed, to avoid explosions.

A more convenient and efficient mode of operation involves gradual introduction of acetaldehyde starting material as well as chlorine into the diluent or reaction mixture, generally a relatively large body of diluent, while otherwise proceeding in the manner described immediately above. Such gradual addition of chlorine and acetaldehyde not only tends to improve yields, but also lessens hazards from explosions. Instead of removing the chlorinated acetaldehyde product intermittently or at the end of the chlorination, the product may, of course, if desired, be removed continuously from the reaction mixture.

From the foregoing, it is apparent my process may be carried out in accordance with any of the well known procedural techniques involving either batch or continuous operation or any combination thereof. Thus, for example, a batch or continuous system may be utilized involving two or more reactors with a portion of the required chlorine being introduced into each reactor and the chlorination of the acetaldehyde starting material taking place in stages in the respective reactors. Further, a partial continuous chlorination of the aldehyde may, if desired, be combined with a batch chlorination of the partially chlorinated aldehyde to facilitate obtaining the desired degree of chlorination.

The initial temperature of the chlorination reaction is normally at least 15° C. with the temperature rising during the course of the exothermic reaction to as high as 100° C. or more. In accordance with the process of the invention, initial temperatures of reaction may be as high as 50° C. or more to thus increase the rate of chlorination. The temperature of chlorination throughout the major portion of the reaction period may vary from about 20 to 130° C., and preferably ranges from about 60 to 90° C. The pressure in the reaction mixture is usually maintained at about atmospheric, although lower or higher pressures are suitable. By using a closed system under superatmospheric pressure, reaction temperatures over 100° C. may be readily obtained.

Constant agitation should be maintained in the reaction mixture to prevent local overheating and high concentrations of acetaldehyde reactant. Such agitation may be effected by passing acetaldehyde and/or the chlorine with an inert gas, e. g. nitrogen or carbon dioxide, into the reaction mixture, the inert gas bubbling through the mixture serving to agitate the latter. The use of an inert gas such as nitrogen or carbon dioxide also tends to minimize explosions. Further, the chlorine may be introduced in the form of a gas near the bottom of the reaction mixture and the HCl liberated in the reaction, in rising through the liquid, may itself provide sufficient agitation to maintain the homogeneity of the mixture. However, mechanical agitation may be employed if desired. Use of packing in a reaction column also gives excellent mixing of the reactants. The instant chlorination process is normally carried out under reflux to permit the evolved HCl and excess chlorine to escape while returning vapors of aldehydes and the like to the reaction mixture.

The polychlorinated acetaldehyde products may be separated from the reaction mixture by distillation. After chlorination is complete, the reaction mixture may first be heated under total reflux to expel dissolved chlorine and HCl and the temperature then raised to allow the polychlorinated acetaldehydes to distill off from the mixture. Chloral and dichloracetaldehyde may be separated from the chlorinated acetic acids when the latter are employed as diluent, by distilling off the reaction product at normal pressure up to a temperature of about 100° C., leaving the higher boiling chlorinated acetic acids as still residue which may be reused as solvent in a succeeding chlorination.

The chlorination equipment employed in the instant process may be glass-lined or porcelain-lined. Tantalum may also be used as a construction material.

The following examples are illustrative of the invention, the quantities stated therein being expressed in parts by weight:

*Example 1.*—Glacial acetic acid, 88 parts, and paraldehyde, 88 parts, were charged into a reactor. Over a period of about 13 hours about 535 parts of chlorine were passed into the reaction mixture. The temperature of the charge during the major portion of the reaction ranged from about 15° C. near the start of the reaction up to about 100° C. at the end of the run. Off gases comprising HCl and excess chlorine were recovered. About 282 parts of reaction mixture were obtained containing chlorinated acetic acid and chlorinated acetaldehyde. On fractional distillation of the reaction product, it was determined that the final reaction mixture contained as the chief polychlorinated aldehyde, dichloracetaldehyde present in amount corresponding to a yield of about 50% based on aldehyde starting material.

*Example 2.*—A reactor was charged with a mixture of 176 parts of trichloracetic acid and 176 parts of paraldehyde. About 1265 parts of chlorine were gradually introduced into the reaction mixture during a period of approximately 20 hours, the temperature of the charge during the major portion of the reaction period ranging from about 15° C. near the start of the reaction to 97° C. at the end of the run. HCl gas liberated in the reaction and excess chlorine passing through the reactor were recovered. 556 parts of final reaction mixture were obtained containing dichloracetaldehyde in yields of about 30% of theory based on aldehyde starting material.

*Example 3.*—176 parts of glacial acetic acid were placed in a reactor and warmed to 27° C. Chlorine was then passed into the acetic acid until the solution was substantially saturated. A mixture of nitrogen and acetaldehyde vapor was then passed into the reaction mixture gradually for a period of about 12½ hours, during which time 183 parts of acetaldehyde were introduced. Over this same period about 1340 parts of chlorine were fed into the reaction mixture to maintain excess chlorine in the mixture at all times. After acetaldehyde addition was stopped, introduction of chlorine was continued for about 2½ hours using about 140 parts of chlorine. During the chlorination period the temperature of the charge increased due to heat of reaction, and was maintained at 35 to 55° C. during a substantial portion of the reaction period with the final temperature reaching 87° C. Off gases from the reactor were passed through a reflux condenser maintained at about 10° C. for the purpose of cooling and returning aldehyde, chlorinated aldehyde and any acetic acid vapors to the reaction mixture. The HCl and excess chlorine passing the condenser were recovered in the conventional manner. About 573 parts of final reaction mixture were obtained containing chlorinated acetic acid, dichloracetaldehyde and chloral. By fractional distillation of a portion of the reaction mixture, the amount of polychlorinated acetaldehyde, considered as chiefly dichloracetaldehyde, present in the reaction mixture was found to correspond to a yield of about 60% of theory.

Other materials not adversely affecting the reaction may also be present in the reaction mixture during the period of chlorination in addition to those materials noted above.

Since various changes and modifications may be made in the invention without departing from the spirit thereof, the invention is to be taken as limited only by the scope of the appended claims.

I claim:

1. The process for producing a polychlorinated acetaldehyde which comprises chlorinating an acetaldehyde in a liquid hydrophilic organic diluent at temperature initially at least 15° C. and maintained throughout the major portion of the reaction period from about 20° to about 130° C., said diluent being substantially inert to said acetaldehyde and the chlorination products thereof and comprising at least one chlorinated compound containing a total of two carbon atoms, one of which constitutes the carbon atom of a carbonyl group, the molar ratio of said diluent to acetaldehyde starting material introduced being at least about ¾ mol of diluent per mol equivalent of acetaldehyde; and carrying out the chlorination in liquid phase until a polychlorinated acetaldehyde is formed.

2. The process for producing a polychlorinated acetaldehyde which comprises adding chlorine and an acetaldehyde gradually to a body of hydrophilic organic diluent maintained in liquid phase at temperature initially at least 15° C. and at temperature throughout the major portion of the reaction period from about 20° C. to about 130° C., said diluent being substantially inert to said acetaldehyde and the chlorination products thereof and comprising at least one chlorinated compound containing a total of two carbon atoms, one of which constitutes the carbon atom of a carbonyl group; maintaining chlorine available for reaction in excess of the theoretical amount required to react with the aldehyde starting material present in the reaction mixture for obtaining a polychlorinated acetaldehyde; stopping the flow of acetaldehyde feed while continuing the flow of chlorine, a total of more than two mols of chlorine being employed per mol of acetaldehyde starting material; and recovering a polychlorinated acetaldehyde as product.

3. The process of claim 2 wherein the acetaldehyde starting material is paraldehyde.

4. The process of claim 2 wherein the diluent comprises a chlorinated acetic acid.

5. The process of claim 2 wherein the diluent comprises a substantial proportion of a chlorinated acetaldehyde.

6. The process of claim 2 wherein the temperature throughout the major portion of the reaction period ranges from 60 to 90° C.

References Cited in the file of this patent

UNITED STATES PATENTS

| Number | Name | Date |
|---|---|---|
| 2,478,152 | Cass | Aug. 2, 1949 |
| 2,478,741 | Brothman | Aug. 9, 1949 |
| 2,615,048 | Pianfetti et al. | Oct. 21, 1952 |
| 2,615,049 | Pianfetti et al. | Oct. 21, 1952 |

OTHER REFERENCES

Pinner: Ann., vol. 179–180, pages 24 and 25 (1875).

Wurtz et al.: Comptes Rend., vol. 74, pages 777 to 784.

Schulz, PB Report—70, 309 (Frame 8241) Released by Office Technical Services, July 18, 1947, pages 1–3.

Shchukina: Chem. Abstracts, April 1949, vol. 39, page 2575c; abstract of an article in Zhur.: Obshchei Khim (Jour. of General Chem.) (Russian), vol. 18, pages 1653–62 (1948).